United States Patent
Wang et al.

(10) Patent No.: US 10,411,949 B2
(45) Date of Patent: Sep. 10, 2019

(54) METHOD AND SYSTEM FOR VIRTUAL NETWORK MAPPING PROTECTION AND COMPUTER STORAGE MEDIUM

(71) Applicant: ZTE Corporation, Shenzhen, Guangdong (CN)

(72) Inventors: Dajiang Wang, Shenzhen (CN); Zhenyu Wang, Shenzhen (CN)

(73) Assignee: ZTE CORPORATION (CN)

( * ) Notice: Subject to any disclaimer, the term of this patent is extended or adjusted under 35 U.S.C. 154(b) by 259 days.

(21) Appl. No.: 14/899,062

(22) PCT Filed: Jun. 20, 2014

(86) PCT No.: PCT/CN2014/080416
§ 371 (c)(1),
(2) Date: Dec. 16, 2015

(87) PCT Pub. No.: WO2014/202026
PCT Pub. Date: Dec. 24, 2014

(65) Prior Publication Data
US 2016/0142246 A1     May 19, 2016

(30) Foreign Application Priority Data
Jun. 21, 2013 (CN) .......................... 2013 1 0249773

(51) Int. Cl.
    *G06F 15/16*     (2006.01)
    *H04L 12/24*     (2006.01)
    *H04L 29/08*     (2006.01)

(52) U.S. Cl.
    CPC .......... *H04L 41/0663* (2013.01); *H04L 67/10* (2013.01); *H04L 69/329* (2013.01)

(58) Field of Classification Search
    CPC ............................ H04L 41/0663; H04L 67/10
    See application file for complete search history.

(56) References Cited

U.S. PATENT DOCUMENTS

| 2002/0097680 | A1 | 7/2002 | Liu |
| 2005/0069314 | A1 | 3/2005 | De Patre |
| 2012/0250500 | A1* | 10/2012 | Liu ........................ H04L 45/22 370/228 |

FOREIGN PATENT DOCUMENTS

| CN | 101330344 A | 12/2008 |
| CN | 101567822 A | 10/2009 |

(Continued)

OTHER PUBLICATIONS

Supplementary European Search Report in European application No. 14813827.4, dated Apr. 28, 2016.

(Continued)

*Primary Examiner* — Hua Fan
(74) *Attorney, Agent, or Firm* — McDonald Hopkins LLC (57) ABSTRACT

Provided are a method and system for protecting virtual network mapping, and a computer storage medium; wherein the method includes that an application layer edits and defines at least one sub-network model based on a network editing request; a network virtualization layer constructs the at least one sub-network model, and integrates the at least one sub-network model into a global network view; and a controller layer respectively maps the at least one sub-network model contained in the global network view into a working device network and a protection device network, and when the working device network has failures, specified conditions are met, and the protection device network has no failure, switches a working mapping relationship of the corresponding sub-network from the working device network to the protection device network.

15 Claims, 5 Drawing Sheets

(56) References Cited

FOREIGN PATENT DOCUMENTS

| | | | |
|---|---|---|---|
| CN | 101656651 | A | 2/2010 |
| CN | 102045239 | A | 5/2011 |
| CN | 103051565 | A | 4/2013 |
| CN | 103051629 | A | 4/2013 |
| EP | 1449320 | A1 | 8/2004 |
| EP | 1449320 | B1 | 2/2006 |
| JP | 2011024263 | A | 2/2011 |
| JP | 2013046322 | A | 3/2013 |
| RU | 2382398 | C2 | 2/2010 |
| WO | 0215498 | A2 | 2/2002 |
| WO | 03047144 | A1 | 6/2003 |
| WO | 2007115493 | A1 | 10/2007 |
| WO | 2012165446 | A1 | 12/2012 |
| WO | 2013063330 | A1 | 5/2013 |

OTHER PUBLICATIONS

Yusuke Nishi,Centralized Multicast Tree Control for rapid VXLAN path fail over,vol. 112 No. 134 IEICE Technical Report, Japan, General Companies the Institute of Electronics, Information and Communication Engineers, Jul. 12, 2012, 112,dated Jul. 12, 2012.
Takaaki Koyama,A proposal of redundant network architecture between cloud data centers,vol. 111 No. 469 IEICE Technical Report,Janpan,The Institute of Electronics, Information and Communication Engineers,Mar. 1, 2012,111, mailed on Mar. 1, 2012.
International Search Report in international application No. PCT/CN2014/080416, dated Sep. 29, 2014.
English Translation of the Written Opinion of the International Search Authority in international application No. PCT/CN2014/080416, dated Sep. 29, 2014.

\* cited by examiner

METHOD AND SYSTEM FOR VIRTUAL NETWORK MAPPING PROTECTION AND COMPUTER STORAGE MEDIUM

TECHNICAL FIELD

The present disclosure relates to the field of network, and in particular to a method and system for protecting virtual network mapping, and a computer storage medium.

BACKGROUND

With the coming of the cloud web age, the industry makes a higher requirement for the development of the Internet; how to meet the growing number of users, types of services and bandwidth requirement, and how to implement a real-time dynamic withdrawal of service flow of the users are the main problems to be solved by the next-generation network technology. The current network is low in efficiency and hard to expand; besides, it wastes a lot of time and resources, and cannot support a flexible operation. In most cases, all network resources spread all over a physical switch and a router which adopt a standardized protocol. Configuring a network device is mainly configuring each switch independently, which results in an extremely complicated network architecture. Especially for a large-scale network and a data centre, to implement a certain transformation, a network operator has to reconfigure a routing protocol for each switch or each router, which needs to waste a lot of time and is very cumbersome.

A Software Defined Network (SDN) can effectively separate network data stream processing from logics and rules controlling the data stream, and enables providers and enterprises to control and manage their own data, thereby realizing the capabilities of implementing different rules and routes, wherein the capabilities include deciding what types of data are processed locally and what types of data are processed remotely. Basically, the SDN enables organizations to see and control access to the network and resource finely, and enables the user to solve the specific problems influencing the network. The users can manage their works through only one portal more quickly, more flexibly and more easily.

Figure 1:
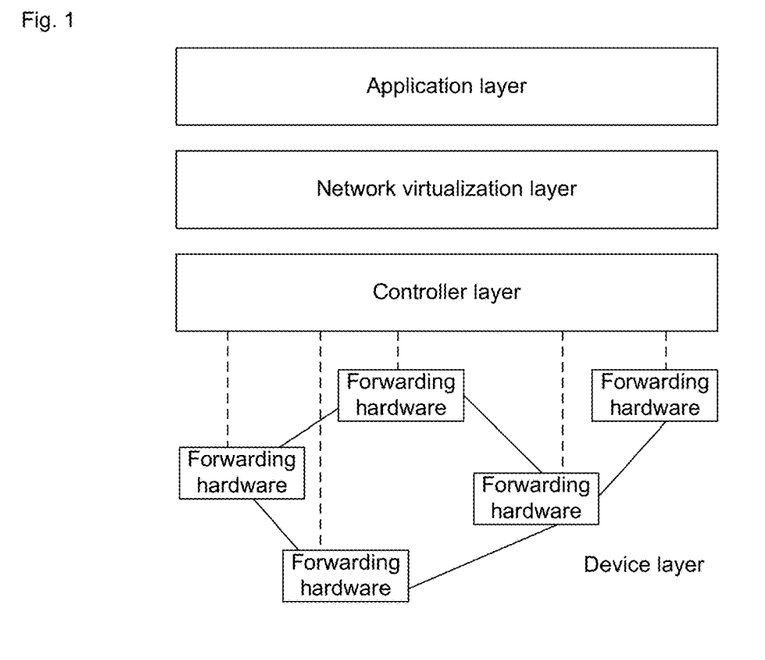
FIG. 1 is a diagram of an SDN architecture in the prior art.

FIG. 1 is a diagram of an SDN architecture in the prior art; as shown in FIG. 1, the SDN architecture mainly includes an application layer, a network virtualization layer, a controller layer and a device layer; wherein, the application layer can enable users to define network models by writing a control program according to their own need; the users can initiate requests of operating (including establishing, deleting, modifying, querying, etc.) a service connection on the network models defined by them;

the network virtualization layer can organize and analyze all the abstract network models defined by the users, and finally form a global network view;

the controller layer can establish a mapping relationship between the global network view and a physical device network, implement an intelligent control over the service connection in the global network view according to service requests sent by the users, and send service connection configurations finally formed in an OpenFlow table item on corresponding device nodes through an OpenFlow protocol or a Path Computation Element Protocol (PCEP) extended protocol;

in the device layer, each device node implements a service scheduling function of this node according to its own OpenFlow table item record.

In the SDN architecture, through opening a northbound interface, the network models needed are defined by the users by writing the programs according to the need. The network models defined by the users can be considered as services that the SDN technology provides for the users; the network models can be configured and moved according to the needs of users without being limited to a physical location; besides, the users can inform the networks of how to run to meet the requirements of application better, such as a bandwidth of service, a requirement for time delay, and an influence of charging on the route.

In the SDN architecture, the controller layer finally completes the normal operation that the user-defined network drives the physical device network through a function of mapping the global network view and the physical device network.

Normally, the mapping relationship between the global network view formed by integrating the user-defined network and the physical layer network is unique. When there are natural disasters and some uncertainties in social life, device node failures and link failures in the physical network appear, which cause interruption of the mapping relationship, and influence the normal operation of the user-defined network. The general approach is to recover the network by relying on a protection mechanism in the physical device network; the protection mechanism is disadvantaged in that:

the randomness of failures in the network cannot be responded; in the complicated physical device networks (including a star network, a grid network, a ring network, etc.), considering the operation cost, the providers usually only protect a part of nodes and links in the network through the ring network, dual-homing and other mechanisms. Each node and each link in the network cannot be protected, and then the randomness of failures in the network cannot be responded objectively.

Depending on the device network which protects the local nodes and links in the network and recovers from the failures, although a mapping relationship between the global network view and the device network can be restored, an optimization solution objective of the original mapping relationship cannot be met.

SUMMARY

For solving the existing technical problems, the present disclosure provides a method and system for protecting virtual network mapping, and a computer storage medium, so as to provide a fast response to the random failures of a device network.

To this end, the present disclosure provides a method for protecting virtual network mapping under the architecture, which includes that:

an application layer edits and defines at least one sub-network model based on a network editing request;

a network virtualization layer constructs the at least one sub-network model, and integrates the at least one sub-network model into a global network view; and a controller layer respectively maps the at least one sub-network model contained in the global network view into a working device network and a protection device network, and when the working device network has failures, specified conditions are met, and the protection device network has no failure, switches a working mapping relationship of a corresponding sub-network from the working device network to the protection device network.

Preferably, after the application layer edits and defines the at least one sub-network model based on the network editing request, the method may further include that:

the application layer sets a protection policy and a mapping optimization solution objective respectively for the at least one sub-network model;

the network virtualization layer respectively records the at least one protection policy and the at least one mapping optimization solution objective of the at least one sub-network model contained in the global network view, and sends the at least one protection policy and the at least one mapping optimization solution objective of the at least one sub-network model and the global network view to the controller layer; and the controller layer respectively maps the at least one sub-network model into the working device network and the protection device network according to the at least one protection policy and the at least one mapping optimization solution objective of the at least one sub-network model.

Preferably, the protection policy of any one of the at least one sub-network model includes any one of followings:

both physical device nodes and links of the working device network and the protection device network are not allowed to be shared;

only physical device nodes of the working device network and the protection device network are allowed to be shared;

links of the working device network and the protection device network are allowed to be shared.

Preferably, the mapping optimization solution objective may include at least one of followings:

minimum resource cost, largest number of mapping, load balancing, and greatest gain.

Preferably, after the working mapping relationship of the corresponding sub-network is switched from the working device network to the protection device network, the method may further include that:

after receiving information which represents full failure recovery of the working device network, the controller layer reverts the working mapping relationship of the corresponding sub-network to the working device network.

The present disclosure also provides a system for protecting virtual network mapping, which includes:

an application layer module, which is configured to edit and define at least one sub-network model based on the network editing request;

a network virtualization layer module, which is configured to construct the at least one sub-network model which is edited and defined by the application layer module, integrate the at least one sub-network model into the global network view, and send the global network view to a controller layer module; and the controller layer module, which is configured to respectively map the at least one sub-network model contained in the global network view which is sent by the network virtualization layer module into the working device network and the protection device network, and when the working device network has failures, the specified conditions are met, and the protection device network has no failure, switch the working mapping relationship of a corresponding sub-network from the working device network to the protection device network.

Preferably, the application layer module may be further configured to, after editing and defining the at least one sub-network model based on the network editing request, set a protection policy and a mapping optimization solution objective respectively for the at least one sub-network model, and send the at least one protection policy and the at least one mapping optimization solution objective to the network virtualization layer module;

the network virtualization layer module is further configured to respectively record the at least one protection policy and the at least one mapping optimization solution objective of the at least one sub-network model contained in the global network view, and send the at least one protection policy and the at least one mapping optimization solution objective of the at least one sub-network model and the global network view to the controller layer module; and the controller layer module is configured to respectively map the at least one sub-network model into the working device network and the protection device network according to the at least one protection policy and the at least one mapping optimization solution objective of the at least one sub-network model which is sent by the network virtualization layer module.

Preferably, the protection policy of any one of the at least one sub-network model which is set by the application layer module may include any one of followings:

both physical device nodes and links of the working device network and the protection device network are not allowed to be shared;

only physical device nodes of the working device network and the protection device network are allowed to be shared;

links of the working device network and the protection device network are allowed to be shared.

Preferably, the mapping optimization solution objective of any one of the at least one sub-network model which is set by the application layer module may include at least one of followings:

minimum resource cost, largest number of mapping, load balancing, and greatest gain.

Preferably, the controller layer module may be further configured to, after switching the working mapping relationship of the corresponding sub-network from the working device network to the protection device network, revert the working mapping relationship of the corresponding sub-network to the working device network after receiving information which represents full failure recovery of the working device network.

The present disclosure also provides a computer storage medium which stores computer-executable instructions for executing the method for protecting virtual network mapping provided in the present disclosure.

With the method and system for protecting virtual network mapping and the computer storage medium, the application layer edits and defines at least one sub-network model based on a network editing request; the network virtualization layer constructs the at least one sub-network model, and integrates the at least one sub-network model into a global network view; and the controller layer respectively maps the at least one sub-network model contained in the global network view into a working device network and a protection device network, and when the working device network has failures, the specified conditions are met, and the protection device network has no failure, switches a working mapping relationship of a corresponding sub-network from the working device network to the protection device network, thus a protection to the mapping relationship between the global network view and the physical layer network is implemented, a fast response to the random failures of the device network is provided, and a protection to the mapping optimization solution objective of the mapping relationship between the global network view and the physical layer network is obtained.

DETAILED DESCRIPTION

For making the aim, the technical solutions and the advantages of the present disclosure more clear, the embodiments of the present disclosure are elaborated below in combination with the accompanying drawings. Note that, the embodiments and the features thereof in this application can be combined with each other if there is no conflict.

In an SDN, the healthy operation of a mapping relationship between a global network view and a device network is very important, and the SDN technology is required to provide a protecting method aiming at this mapping. To this end, the present disclosure provides a method for protecting virtual network mapping under the SDN architecture, aiming at implementing a protection to the mapping relationship between a global network view and a physical layer network, providing a fast response to the random failures of a device network, and implementing a protection to the mapping optimization solution objective of the mapping relationship between the global network view and the physical layer network by the protecting method.

Figure 2:
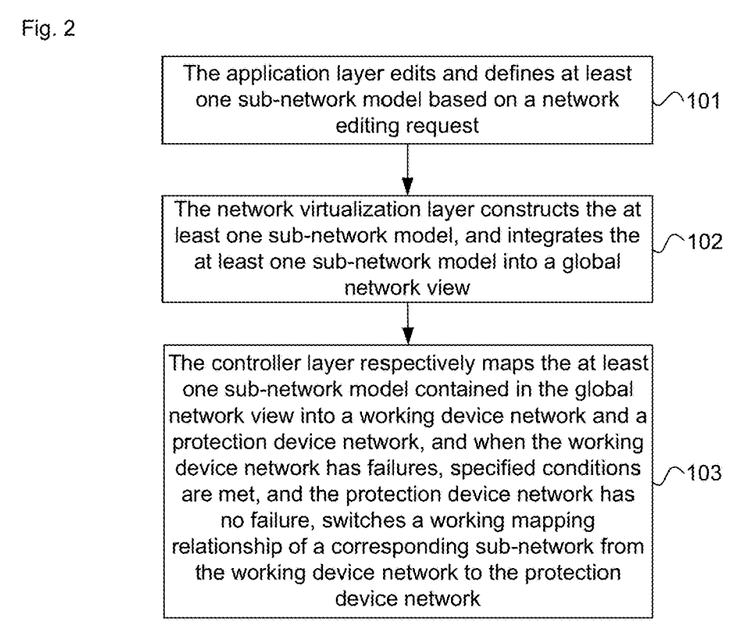
FIG. 2 is a flowchart of a method for protecting virtual network mapping under the SDN architecture according to an embodiment of the present disclosure.

FIG. 2 is a flowchart of a method for protecting virtual network mapping according to an embodiment of the present disclosure; as shown in FIG. 2, the method in this embodiment includes the following steps.

Step 101 is that an application layer edits and defines at least one sub-network model based on a network editing request.

Here, after the application layer edits and defines the at least one sub-network model based on the network editing request, the method further includes that:

the application layer sets a protection policy and a mapping optimization solution objective respectively for the at least one sub-network model.

Specifically, the application layer receives the network editing request respectively sent by each user, edits and defines the at least one sub-network model based on the requirement of each user, and can set a protection policy and a mapping optimization solution objective respectively for the defined at least one sub-network model.

Step 102 is that a network virtualization layer constructs the at least one sub-network model, and integrates the at least one sub-network model into a global network view.

Here, the network virtualization layer respectively records the at least one protection policy and the at least one mapping optimization solution objective of the at least one sub-network model contained in the global network view; wherein, the network virtualization layer records the at least one protection policy and the at least one mapping optimization solution objective of the at least one sub-network model for backup, and the network virtualization layer transfers information of the global network view (containing the at least one protection policy and the at least one mapping optimization solution objective of the at least one sub-network model) to the controller layer.

Step 103 is that a controller layer respectively maps the at least one sub-network model contained in the global network view into a working device network and a protection device network, and when the working device network has failures, the specified conditions are met, and the protection device network has no failure, switches a working mapping relationship of a corresponding sub-network from the working device network to the protection device network.

Here, the controller layer respectively maps the at least one sub-network model into the working device network and the protection device network according to the at least one protection policy and the at least one mapping optimization solution objective of the at least one sub-network model.

Figure 3:
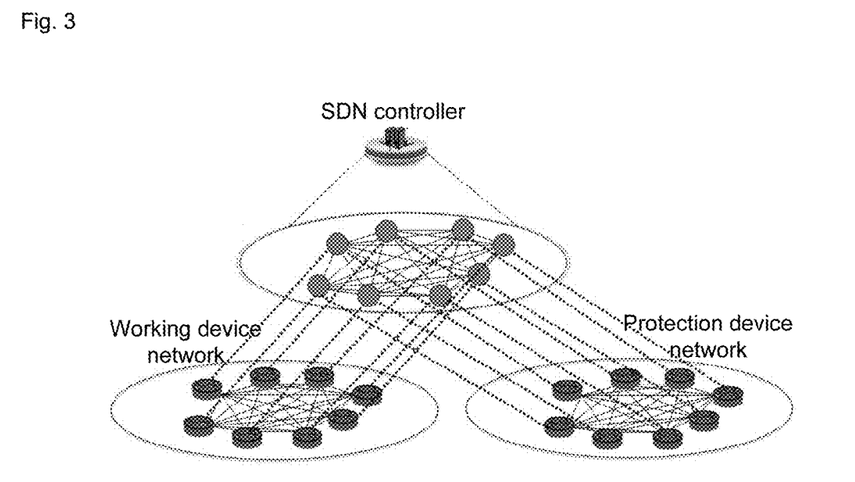
FIG. 3 is a diagram of a mapping relationship between sub-network models and physical layer device networks according to an embodiment of the present disclosure.
Figure 4:
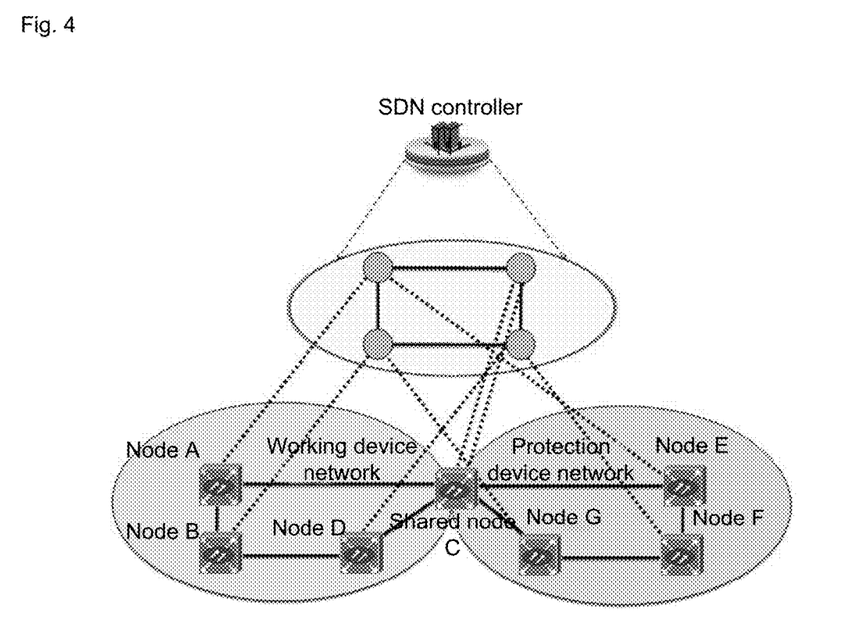
FIG. 4 is a diagram of only allowing sharing of the nodes of a working device network and a protection device network according to an embodiment of the present disclosure.
Figure 5:
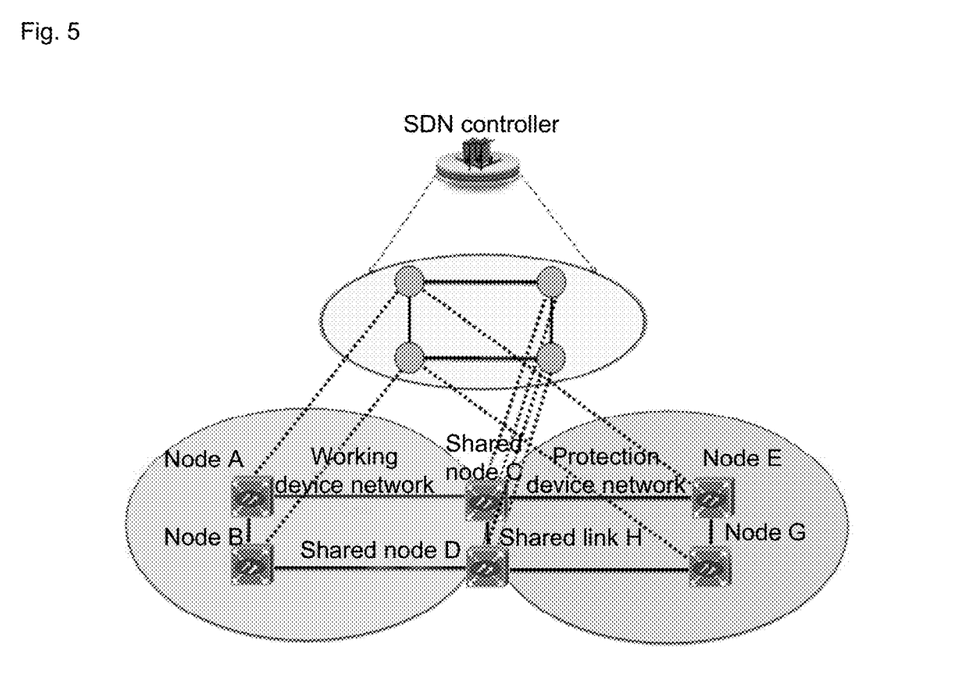
FIG. 5 is a diagram of allowing sharing of links of a working device network and a protection device network according to an embodiment of the present disclosure.

Specifically, the controller layer is responsible for completing the mapping between the global network view and the physical layer network device; in the process of mapping, corresponding mapping protection mechanisms for all the sub-network(s) can be respectively constructed for all the sub-network model(s) contained in the global network view, the protection policy(ies) (e.g. user levels) and the mapping optimization solution objective(s) of all the sub-network model(s). The specific method is as follows:

A. the same sub-network model is mapped to a working device network mapping relationship and a protection device network mapping relationship according to a protection policy and a mapping optimization solution objective, wherein functions of the two mapping relationships are completely the same;

B. normally, the mapping relationship between the sub-network and the working device network is in a working state, and the mapping relationship between the sub-network and the protection device network is in a non-working state;

C. when the working device network has failures (e.g. device node failures or link failures) and the protection device network is in a normal state without failure at the moment, the controller layer is responsible for switching the mapping relationship between the sub-network and the protection device network to a working state, and then the mapping relationship between the sub-network and the working device network becomes a non-working state.

here, there are several protection policies for the mapping relationship between the at least one sub-network model and the physical device network as follows:

a VIP distinguished guest service level: protection is provided, and there is absolutely no correlation between a working device network and a protection device network; that is, both the physical device nodes and links of the working device network and the protection device network are not allowed to be shared, there is no overlap between the protection network and the working network, and the protection network is not influenced by the working network; FIG. 3 is a diagram of a mapping relationship between sub-network models and physical layer device networks according to an embodiment of the present disclosure; as shown in FIG. 3, there is no overlap between the working device network and the protection device network, and there is no mutual influence between them;

a common distinguished guest service level: protection is provided, and only the nodes of a working device network and a protection device network are allowed to be shared; FIG. 4 is a diagram of only allowing the nodes of the working device network and the protection device network to be shared according to an embodiment of the present disclosure; as shown in FIG. 4, only the shared nodes C of the working device network and the protection device network are allowed to be shared; preferably, at least two nodes can be allowed to be shared;

a member service level: protection is provided, and the links of a working device network and a protection device network are allowed to be shared (information of the shared nodes and links is created by the controller layer), which can save network resources; FIG. 5 is a diagram of allowing sharing of the links of a working device network and a protection device network according to an embodiment of the present disclosure; as shown in FIG. 5, the working device network and the protection device network are allowed to share the nodes C and D, and are allowed to share the link H; and a common user service level: no protection is provided, and the recovery of the mapping relationship with a sub-network model is implemented by relying only on a device protection switching mechanism in a device network.

Here, the mapping optimization solution objective can include at least one of the following:

the minimum resource cost, the largest number of mapping, load balancing, the greatest gain, and so on.

The present disclosure also provides a computer storage medium which stores computer-executable instructions; the computer executable instructions are for executing the method for protecting virtual network mapping provided in the embodiment of the present disclosure.

Figure 6:
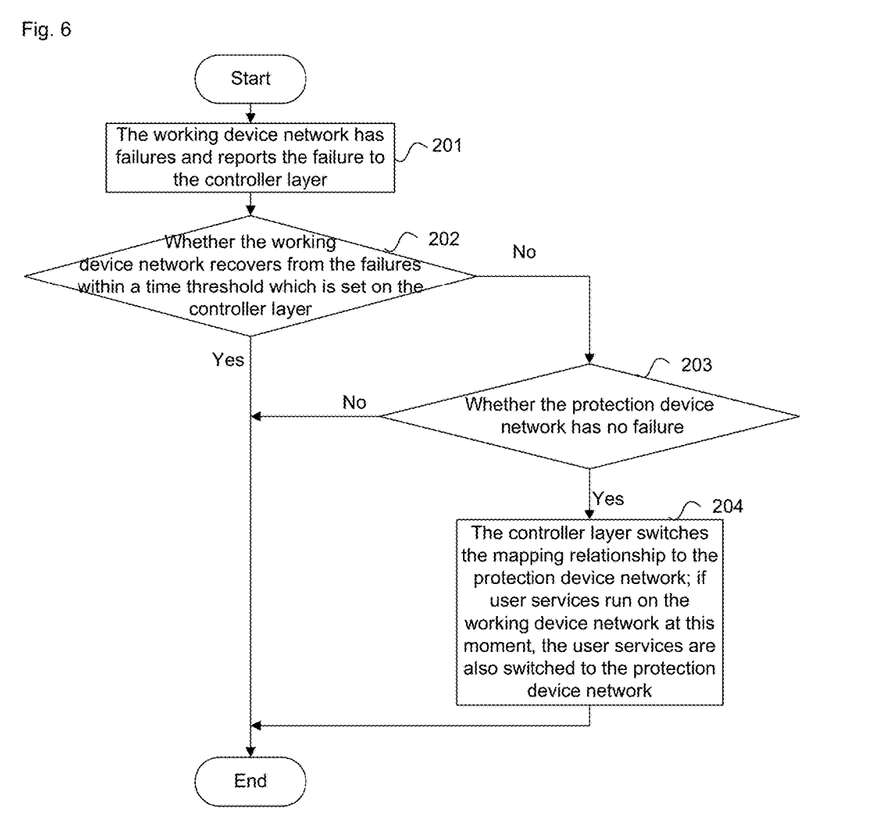
FIG. 6 is a flowchart of a method for switching a mapping relationship between a sub-network model and a device network according to an embodiment of the present disclosure.

FIG. 6 is a flowchart of a method for switching a mapping relationship between a sub-network model and a device network according to an embodiment of the present disclosure; as shown in FIG. 6, the method for switching the mapping relationship between a sub-network model and a device network of this embodiment can include the following steps.

Step 201 is that a working device network has failures and reports to a controller layer.

Here, the failures of the working device network may include the node failures or the link failures of the working device network.

Step 202 is that it is judged whether the working device network recovers from the failures in a time threshold which is set on the controller layer; if it recovers, Step 203 is performed; or else, the current operation process is ended.

Step 203 is that it is judged whether the protection device network has no failure; if the judgment result is positive, Step 204 is performed; or else, the current operation process is ended.

Step 204 is that the controller layer switches the mapping relationship to the protection device network.

Here, if user services run on the working device network, the user services are also switched to the protection device network.

The present disclosure also provides a computer storage medium which stores computer-executable instructions; the computer executable instructions are for executing the method for protecting virtual network mapping provided in the present disclosure.

Figure 7:
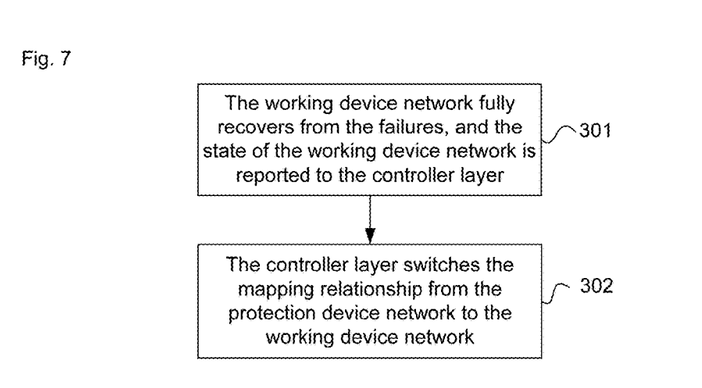
FIG. 7 is a flowchart of a method for reverting virtual network mapping after a working network recovers from failures according to an embodiment of the present disclosure.

FIG. 7 is a flowchart of a method for reverting virtual network mapping after a working network recovers from the failure according to an embodiment of the present disclosure; as shown in FIG. 7, the method can include the following steps.

Step 301 is that the working device network fully recovers from failures, and the state of the working device network is reported to the controller layer.

Here, the working device network fully recovers from the failures, then the state of the working network is normal, and the normal state of the working network is reported to the controller layer.

Step 302 is that the controller layer switches the mapping relationship from the protection device network to the working device network.

The present disclosure also provides a computer storage medium which stores computer-executable instructions; the computer executable instructions are for executing the method for protecting virtual network mapping provided in the present disclosure.

Specifically, if user services run on the protection device network, the user services are also switched to the working device network.

Figure 8:
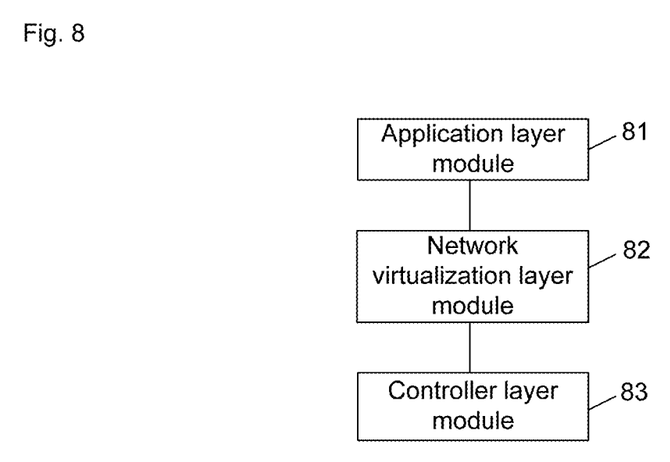
FIG. 8 is a structural diagram of a system for protecting virtual network mapping according to an embodiment of the present disclosure.

FIG. 8 is a structural diagram of a system for protecting virtual network mapping according to an embodiment of the present disclosure; as shown in FIG. 8, the system of the embodiment includes:

an application layer module 81, which is configured to edit and define at least one sub-network model based on a network editing request;

the network virtualization layer module 82, which is configured to construct the at least one sub-network model which is edited and defined by the application layer module 81, integrate the at least one sub-network model into a global network view, and send the global network view to the controller layer module; and the controller layer module 83, which is configured to respectively map the at least one sub-network model contained in the global network view which is sent by the network virtualization layer module 82 into a working device network and a protection device network, and when the working device network has failures, the specified conditions are met, and the protection device network has no failure, switch a working mapping relationship of a corresponding sub-network from the working device network to the protection device network.

In a preferred embodiment, the application layer module 81 is further configured to, after editing and defining the at least one sub-network model based on the network editing request, set a protection policy and a mapping optimization solution objective respectively for the at least one sub-network model, and send the at least one protection policy and the at least one mapping optimization solution objective to the network virtualization layer module 82;

the network virtualization layer module 82 is further configured to respectively record the at least one protection policy and the at least one mapping optimization solution objective of the at least one sub-network model contained in the global network view, and send the at least one protection policy and the at least one mapping optimization solution objective of the at least one sub-network model and the global network view to the controller layer module 83; and the controller layer module 83 is configured to respectively map the at least one sub-network model into the working device network and the protection device network according to the at least one protection policy and the at least one mapping optimization solution objective of the at least one sub-network model which is sent by the network virtualization layer module 82.

Wherein, the protection policy of any one of the at least one sub-network model which is set by the application layer module 81 may include any one of the following:

both the physical device nodes and the links of the working device network and the protection device network are not allowed to be shared;

only the physical device nodes of the working device network and the protection device network are allowed to be shared;

the links of the working device network and the protection device network are allowed to be shared.

Here, the mapping optimization solution objective of any one of the at least one sub-network model which is set by the application layer module 81 includes at least one of the following:

the minimum resource cost, the largest number of mapping, load balancing and the greatest gain.

In a preferred embodiment, the controller layer module 83 is further configured to, after switching the working mapping relationship of the corresponding sub-network from the working device network to the protection device network, revert the working mapping relationship of the corresponding sub-network to the working device network after receiving information which represents full failure recovery of the working device network.

Here, in practical application, the system for protecting virtual network mapping can be implemented any node device in an SDN; all of the application layer module 81, the network virtualization layer module 82 and the controller layer module 83 in the system for protecting virtual network mapping can be implemented by a Central Processing Unit (CPU), a Digital Signal Processor (DSP) or a Field-Programmable Gate Array (FPGA) in the system.

The present disclosure is described with reference to the flowcharts and/or block diagrams of the method, the system and the computer program product according to the embodiments of the present disclosure. It should be understood that each flow and/or block in a flowchart and/or block diagram, and the combination of the flows and/or blocks in the flowchart and/or block diagram can be implemented by computer program instructions. These computer program instructions can be provided to a processing unit of a general-purpose computer, a special-purpose computer, an embedded processor or other programmable data processing equipment to generate a machine, so that instructions which are executed by the processing unit of the computer or other programmable data processing equipment generate a device which is for implementing specified functions in one or more flows of the flowchart and/or one or more blocks of the block diagram.

These computer program instructions may also be stored in a computer-readable memory which can guide the computer or other programmable data processing equipment to work in a particular way, so that the instructions stored in the computer-readable memory generate a product including an instruction device, wherein the instruction device implements the specified functions in one or more flows of the flowchart and/or one or more blocks of the block diagram.

These computer program instructions can also be loaded on the computer or other programmable data processing equipment, so that a series of operation steps are executed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

The above are only the preferred embodiments of the present disclosure and not intended to limit the scope of the claims of the present disclosure.

INDUSTRIAL APPLICABILITY

In the present disclosure, an application layer edits and defines at least one sub-network model based on a network editing request; a network virtualization layer constructs the at least one sub-network model, and integrates the at least one sub-network model into a global network view; and a controller layer respectively maps the at least one sub-network model contained in the global network view into a working device network and a protection device network, and when the working device network has failures, the specified conditions are met, and the protection device network has no failure, switches a working mapping relationship of a corresponding sub-network from the working device network to the protection device network, thus a protection to the mapping relationship between the global network view and the physical layer network is implemented, a fast response to the randomness of failures of the device network is provided, and a protection to the mapping optimization solution objective of the mapping relationship between the global network view and the physical layer network is obtained.

What is claimed is:

1. A method for protecting virtual network mapping, comprising:

editing and defining, by an application layer, at least one sub-network model based on a network editing request;

constructing, by a network virtualization layer, at least one sub-network model according to the edited and defined at least one sub-network model, and integrating the constructed at least one sub-network model into a global network view, wherein the global network view comprises at least one protection policy and at least one mapping optimization solution objective of the at least one sub-network model for back up; and mapping, by a controller layer, the at least one sub-network model comprised in the global network view into a working device network and a protection device network according to the at least one protection policy and the at least one mapping optimization solution objective of the at least one sub-network model, determining whether the working device network has failures, and switching a working mapping relationship of a corresponding sub-network from the working device network to the protection device network when the working device network has failures to protect the at least one mapping optimization solution objective;

wherein each protection policy is configured according to a service level, the service level comprising a VIP distinguished guest service level, a common distinguished guest service level and a member service level, and the protection policy comprises the following:

both physical device nodes and links of the working device network and the protection device network are not allowed to be shared under the VIP distinguished guest service level;

only physical device nodes of the working device network and the protection device network are allowed to be shared under the common distinguished guest service level; and links of the working device network and the protection device network are allowed to be shared under the member service level.

2. The method according to claim 1, after editing and defining, by the application layer, the at least one sub-network model based on the network editing request, the method further comprising:

setting, by the application layer, the at least one protection policy and the at least one mapping optimization solution objective for the at least one sub-network model; and recording, by the network virtualization layer, the at least one protection policy and the at least one mapping optimization solution objective of the at least one sub-network model comprised in the global network view, and sending the at least one protection policy and the at least one mapping optimization solution objective of the at least one sub-network model and the global network view to the controller layer.

3. The method according to claim 2, wherein the mapping optimization solution objective comprises at least one of followings:

minimum resource cost, largest number of mapping, load balancing, or greatest gain.

4. The method according to claim 3, after switching the working mapping relationship of the corresponding sub-network from the working device network to the protection device network, the method further comprising:

after receiving information which represents full failure recovery of the working device network, reverting, by the controller layer, the working mapping relationship of the corresponding sub-network to the working device network.

5. The method according to claim 2, after switching the working mapping relationship of the corresponding sub-network from the working device network to the protection device network, the method further comprising:

after receiving information which represents full failure recovery of the working device network, reverting, by the controller layer, the working mapping relationship of the corresponding sub-network to the working device network.

6. The method according to claim 1, after switching the working mapping relationship of the corresponding sub-network from the working device network to the protection device network, the method further comprising:

after receiving information which represents full failure recovery of the working device network, reverting, by the controller layer, the working mapping relationship of the corresponding sub-network to the working device network.

7. A system for protecting virtual network mapping, comprising a processor and a memory, wherein the memory is coupled to the processor for storing a computer readable program, which when executed by the processor causes the processor to:

edit and define at least one sub-network model based on a network editing request;

construct at least one sub-network model according to the edited and defined at least one sub-network model, and integrate the constructed at least one sub-network model into a global network view, wherein the global network view comprises at least one protection policy and at least one mapping optimization solution objective of the at least one sub-network model for back up; and map the at least one sub-network model comprised in the global network view into a working device network and a protection device network according to the at least one protection policy and the at least one mapping optimization solution objective of the at least one sub-network model, determine whether the working device network has failures, and switch a working mapping relationship of a corresponding sub-network from the working device network to the protection device network when the working device network has failures to protect the at least one mapping optimization solution objective;

wherein each protection policy is configured according to a service level, the service level comprising a VIP distinguished guest service level, a common distinguished guest service level and a member service level, and the protection policy comprises the following:

both physical device nodes and links of the working device network and the protection device network are not allowed to be shared under the VIP distinguished guest service level;

only physical device nodes of the working device network and the protection device network are allowed to be shared under the common distinguished guest service level; and links of the working device network and the protection device network are allowed to be shared under the member service level.

8. The system according to claim 7, wherein the processor is further configured to:

set the at least one protection policy and the at least one mapping optimization solution objective for the at least one sub-network model; and record the at least one protection policy and the at least one mapping optimization solution objective of the at least one sub-network model comprised in the global network view, and send the at least one protection policy and the at least one mapping optimization solution objective of the at least one sub-network model and the global network view to the controller layer.

9. The system according to claim 8, wherein the mapping optimization solution objective comprises at least one of followings:

minimum resource cost, largest number of mapping, load balancing, or greatest gain.

10. The system according to claim 9, wherein the processor is further configured to, after switching the working mapping relationship of the corresponding sub-network from the working device network to the protection device network, revert the working mapping relationship of the corresponding sub-network to the working device network after receiving information which represents full failure recovery of the working device network.

11. The system according to claim 8, wherein the processor is further configured to, after switching the working mapping relationship of the corresponding sub-network from the working device network to the protection device network, revert the working mapping relationship of the corresponding sub-network to the working device network after receiving information which represents full failure recovery of the working device network.

12. The system according to claim 7, wherein the processor is further configured to, after switching the working mapping relationship of the corresponding sub-network from the working device network to the protection device network, revert the working mapping relationship of the corresponding sub-network to the working device network after receiving information which represents full failure recovery of the working device network.

13. A non-transitory computer storage medium, storing computer-executable instructions for executing a method for protecting virtual network mapping which comprises:
    editing and defining, by an application layer, at least one sub-network model based on a network editing request;
    constructing, by a network virtualization layer, at least one sub-network model according to the edited and defined at least one sub-network model, and integrating the constructed at least one sub-network model into a global network view, wherein the global network view comprises at least one protection policy and at least one mapping optimization solution objective of the at least one sub-network model for back up; and
    mapping, by a controller layer, the at least one sub-network model contained in the global network view into a working device network and a protection device network according to the at least one protection policy and the at least one mapping optimization solution objective of the at least one sub-network model, determining whether the working device network has failures, and switching a working mapping relationship of a corresponding sub-network from the working device network to the protection device network when the working device network has failures to protect the at least one mapping optimization solution objective;
    wherein each protection policy is configured according to a service level, the service level comprising a VIP distinguished guest service level, a common distinguished guest service level and a member service level, and the protection policy comprises the following:
        both physical device nodes and links of the working device network and the protection device network are not allowed to be shared under the VIP distinguished guest service level;
        only physical device nodes of the working device network and the protection device network are allowed to be shared under the common distinguished guest service level; and
        links of the working device network and the protection device network are allowed to be shared under the member service level.

14. The non-transitory computer storage medium according to claim 13, wherein after editing and defining, by the application layer, the at least one sub-network model based on the network editing request, the computer-executable instructions are for executing the method which further comprises:
    setting, by the application layer, the at least one protection policy and the at least one mapping optimization solution objective for the at least one sub-network model; and
    recording, by the network virtualization layer, the at least one protection policy and the at least one mapping optimization solution objective of the at least one sub-network model comprised in the global network view, and sending the at least one protection policy and the at least one mapping optimization solution objective of the at least one sub-network model and the global network view to the controller layer.

15. The non-transitory computer storage medium according to claim 14, wherein the mapping optimization solution objective comprises at least one of followings:
    minimum resource cost, largest number of mapping, load balancing, or greatest gain.

* * * * *